US 6,713,113 B2

(12) United States Patent
Bisperink et al.

(10) Patent No.: US 6,713,113 B2
(45) Date of Patent: Mar. 30, 2004

(54) FOAMING INGREDIENT AND POWDERS CONTAINING IT

(75) Inventors: Christiaan Bisperink, EZ Ravenstein (NL); Gerhard Ufheil, New Milford, CT (US); Gilles Vuataz, Blonay (CH); Annemarie Johanna Endrika Schoonman, Montreux (CH)

(73) Assignee: Nestec S.A., Vevey (CH)

( * ) Notice: Subject to any disclaimer, the term of this patent is extended or adjusted under 35 U.S.C. 154(b) by 182 days.

(21) Appl. No.: 10/066,445

(22) Filed: Feb. 1, 2002

(65) Prior Publication Data

US 2002/0127322 A1 Sep. 12, 2002

Related U.S. Application Data

(63) Continuation of application No. PCT/EP00/07134, filed on Jul. 25, 2000.

(30) Foreign Application Priority Data

Aug. 3, 1999 (EP) .............................................. 99115294

(51) Int. Cl.$^7$ ....................... A23C 11/04; A23C 11/06; A23F 5/40
(52) U.S. Cl. ..................... 426/564; 426/570; 426/588; 426/591; 426/474; 426/477; 426/516; 426/518
(58) Field of Search ......................... 426/69, 564, 570, 426/588, 477, 474, 516, 518, 591

(56) References Cited

U.S. PATENT DOCUMENTS

| 4,438,147 | A | * | 3/1984 | Hedrick, Jr. ................. 426/570 |
| 5,462,759 | A |   | 10/1995 | Westerbeek et al. ......... 426/568 |
| 5,780,092 | A | * | 7/1998 | Agbo et al. ................... 426/569 |
| 5,882,716 | A | * | 3/1999 | Munz-Schaerer et al. ... 426/591 |
| 5,997,936 | A | * | 12/1999 | Jimenez-Laguna .......... 426/565 |
| 6,048,567 | A | * | 4/2000 | Villagran et al. ............ 426/594 |
| 6,129,943 | A | * | 10/2000 | Zeller et al. ................. 526/564 |

FOREIGN PATENT DOCUMENTS

| CA | 1291661 | 11/1991 |
| EP | 0 458 310 | 11/1991 |
| EP | 0 579 328 | 1/1994 |
| EP | 000579328 A1 * | 1/1994 |
| EP | 0 756 844 | 2/1997 |
| EP | 0 813 815 | 12/1997 |
| EP | 0 885 566 | 12/1998 |
| WO | WO 98/07329 | 2/1998 |

* cited by examiner

Primary Examiner—Nina Bhat
(74) Attorney, Agent, or Firm—Winston & Strawn LLP

(57) ABSTRACT

A powdered soluble foamer ingredient for producing enhanced foam in foodstuffs and beverages is described. The particles of the powdered soluble foamer ingredient are formed of a matrix containing carbohydrate and protein and entrapped gas. The gas is pressurised to release upon addition of liquid at least about 1 ml of gas at ambient conditions per gram of soluble foamer ingredient. When used in soluble creamer powders, enhanced amounts of foam are generated.

20 Claims, No Drawings

US 6,713,113 B2

FOAMING INGREDIENT AND POWDERS CONTAINING IT

CROSS-REFERENCE TO RELATED APPLICATIONS

This application is a continuation of the U.S. national stage designation of International application PCT/EP00/07134 filed Jul. 25, 2000, the entire content of which is expressly incorporated herein by reference thereto.

FIELD OF THE INVENTION

This invention relates to a soluble foamer ingredient which, upon addition of a liquid, induces the formation of or forms a foam. The invention also relates to a soluble foamer ingredient for producing enhanced foam in foodstuffs and beverages. In particular the invention relates to a soluble creamer ingredient. The invention also relates to a soluble creamer powder which contains the soluble creamer ingredient, and a soluble beverage powder which contains the soluble creamer powder. The soluble beverage powder may be of the instant "cappuccino" type.

BACKGROUND OF THE INVENTION

Soluble foamer or creamer powders which, upon addition of a liquid, are able to provide a creamy foam have many uses. For example, these creamer powders may be used to provide milk shakes and cappuccino beverages. They may also have food applications such as desserts, soups, and sauces.

Soluble coffee beverage products which produce cappuccino beverages are particularly well known. Usually these products are a dry mix of a soluble coffee powder and a soluble beverage creamer. The soluble beverage creamer contains pockets of gas which, upon dissolution of the powder, produce foam. Therefore, upon the addition of water or milk (usually hot), a whitened coffee beverage, which has a foam on its upper surface, is formed; the beverage resembling, to a greater or lesser extent, traditional Italian cappuccino. Examples of these gassed soluble beverage creamers are described in European patent applications No 0154192, 0458310 and 0885566. Soluble beverage creamers which contain inorganic foaming agents are also available.

Ideally, to closely resemble a traditional Italian cappuccino, a light, fluffy and stable foam should form on the surface of the beverage. However, quite often the foam produced by many soluble cappuccino powders is not light and fluffy. Further, the amount of foam produced is often less than that ordinarily found on a traditional cappuccino. The amount of foam may, to some extent, be increased by increasing the amount of soluble beverage creamer in the coffee beverage product. However this influences the flavor of the beverage which is not always desirable.

Therefore there is still a need for a soluble beverage creamer which is able to provide a good, stable foam upon reconstitution.

SUMMARY OF THE INVENTION

Accordingly, in one aspect, this invention provides a powdered soluble foamer ingredient which comprises a matrix containing carbohydrate and protein and entrapped gas, the gas being present in an amount to release upon addition of liquid at least about 1 ml of gas at ambient conditions per gram of soluble foamer ingredient.

The soluble foamer ingredient provides the advantage that, when included in a soluble foamer powder, it is able to generate or induce the formation of much greater volumes of foam than conventional foaming powders, such a as conventional foaming creamer powders.

Preferably the gas is present in an amount to release about 1.5 ml to about 25 ml of gas at room temperature per gram of soluble foamer ingredient; for example about 1.8 ml to about 20 ml. More preferably from about 6 ml to about 18 ml.

In the present context ambient conditions refer to standard temperature and pressure conditions (STP). The release of gas is determined as described in the examples.

In another aspect, this invention provides a powdered soluble foamer ingredient for producing enhanced foam in foodstuffs and beverages, the ingredient comprising a matrix containing carbohydrate and protein and entrapped gas under pressure, the ingredient being obtainable by subjecting porous particles of the matrix to an atmosphere of the gas at a raised pressure and a temperature above the glass transition temperature of the particles; and quenching or curing the particles.

In preferred embodiments of the invention the powdered soluble roamer ingredient is a powdered soluble creamer ingredient.

In further aspect, this invention provides a soluble creamer powder which comprises a soluble creamer ingredient having a matrix containing carbohydrate and protein and entrapped gas, the soluble creamer powder generating a foam of volume at least about 2.5 ml/g of soluble creamer powder when reconstituted in liquid.

Preferably the soluble creamer powder generates a foam of volume of about 5 ml/g of soluble creamer powder to about 40 ml/g of powder when reconstituted in liquid. More preferably a foam volume from about 8 ml/g of powder to about 35 ml/g of soluble creamer powder is generated when the soluble creamer powder is reconstituted in liquid. For example, the soluble creamer powder may generate a foam of volume of about 7 ml/g to about 20 m/g when the powder is reconstituted in hot water. Preferably, the foam volume is from about 10 ml/g of powder to about 30 ml/g of powder when reconstituted in hot water. The foam volume will depend on the amount of soluble roamer ingredient in the powder. Further, the foam volume may depend on the liquid composition and temperature.

Upon dissolution in hot or cold water, the soluble creamer powder forms a light, fluffy and stable foam. Further, the soluble creamer powder may provide at least twice as much foam per unit weight as do conventional creamers.

In an additional aspect, this invention provides a soluble food powder which comprises a soluble foamer ingredient having a matrix containing carbohydrate and protein and entrapped gas, the soluble food powder generating a foam of volume at least about 5 ml ml/g of soluble foamer ingredient when reconstituted in liquid.

In yet another aspect, this invention provides a soluble beverage powder, the soluble beverage powder comprising a soluble coffee powder and a soluble creamer ingredient or creamer powder as defined above. The invention also provides a soluble beverage powder, the soluble beverage powder comprising a soluble beverage base powder such as e.g. cocoa or malt powder and a soluble creamer ingredient or creamer powder as defined above.

DETAILED DESCRIPTION OF THE PREFERRED EMBODIMENTS

Preferred embodiments of the invention are now described by way of example only. This invention provides a soluble foamer ingredient which is able to generate large amounts of gas per unit weight. Therefore the soluble foamer ingredient may be used in soluble foamer powders to produce increased amounts of foam when the foamer powder is reconstituted with liquid. In the following the invention will be described with reference to a soluble creamer ingredient, which is one of the preferred applications of the present invention. It will however be appreciated that the invention also may have other applications such as beverages, desserts, sauces, soups etc.

The soluble creamer ingredient is primarily a matrix containing carbohydrate, protein and entrapped gas. The carbohydrate in the matrix may be any suitable carbohydrate or carbohydrate mixture. Suitable examples include lactose, dextrose, fructose, sucrose, maltodextrin, corn syrup, starch, modified starch, cyclodextrin, dextrose, fructose, and the like, and mixtures of these carbohydrates. Mixtures containing maltodextrin are particularly preferred. For example, the carbohydrate may be a mixture of about 40% to about 80% by weight of maltodextrin, sucrose and lactose. Sucrose preferably provides about 5% to about 30% by weight of the mixture. Lactose preferably provides about 5% to about 30% by weight of the mixture. Maltodextrin preferably provides 10% to 50% by weight of the mixture.

The carbohydrate preferably provides about 40% to about 98%; more preferably about 60% to about 95% by weight of the matrix; and even more preferably about 70% to about 90% by weight.

The protein in the matrix may be any suitable protein or protein mixture. Suitable examples include milk proteins (casein or whey, or both), soy proteins, wheat proteins, gelatine, caseinates, and the like. A particularly suitable source of protein is non-fat milk solids. These solids may be provided in dry or liquid form (as skimmed milk). Another suitable source of protein is sweet whey; for example in the form of sweet whey powder. Sweet whey powder usually contains a mixture of lactose and whey protein. If the protein is provided by protein source such as non-fat milk solids or sweet whey, the protein source will usually also provide some carbohydrate in the form of lactose.

The protein preferably provides about 5% to about 50% by weight of the matrix; for example from 5% to about 40%; more preferably about 10% to about 30% by weight.

The matrix may contain fat as an ingredient. The fat in the matrix may be any suitable fat or fat mixture. Suitable examples include milk fat, vegetable fat, and animal fat. The origin of the fat, its composition and its physical characteristics such as melting or crystallization temperatures may influence both the foaming capacity of the soluble foamer ingredient and the stability of the foam obtained. The fat preferably provides about 0% to 30% by weight of the matrix. Foaming creamer might contain fat for example, as fat is generally favorable for gas entrapment, but not for stability of entrapped gas.

A gas is entrapped in the matrix. The gas may be any suitable food grade gas. For example, the gas may be nitrogen, carbon dioxide or air, and mixtures of these gases. Gases which are substantially inert are preferred. To provide the enhanced foaming, the gas is introduced into the matrix under pressure; for example at above about 100 kPa gauge. Preferably, the gas is introduced into the matrix at above about 500 kPa gauge; for example at about 1 MPa to about 20 MPa.

The gas may be introduced into the matrix by any suitable process. One suitable technique involves providing the matrix in the form of expanded particles and then entrapping gas in the particles. The expanded particles may be produced by injecting a gas into an aqueous matrix concentrate having a solids content above about 30% by weight and then spray drying the concentrate to powder. The gas may be injected into the aqueous matrix concentrate at a pressure of about 500 kPa to about 5 MPa. However, the pressure at which the gas is injected into the matrix concentrate is not critical. The gassed aqueous matrix is then spray dried to powder. The particles are then subjected to an inert gas atmosphere at high pressure and at a temperature above the glass transition temperature of the particles. The pressure may be from about 100 kPa gauge to about 20 MPa gauge. The temperature needed will depend upon the composition of the particles since this will influence the glass transition temperature. However, the temperature may be readily set for any particle type by the skilled person. Temperatures more than about 50° C. above the glass transition temperature are probably best avoided. The particles may be subjected to the pressure and temperature for as long as desired since increasing the time will generally increase the gas entrapment. Usually times of about 10 seconds to about 30 minutes are sufficient. The particles are then subjected to rapid quenching or curing to ensure entrapment of the gas. Rapidly releasing the pressure may well be sufficient to quench the particles. Otherwise suitable cooling procedures may be used.

Another suitable technique involves injecting gas into a molten mass of the matrix which contains little or no moisture; for example in an extruder. The gas may be injected at a pressure of about 100 kPa gauge to about 20 MPa gauge. The temperature required will depend upon the composition of the matrix since this will influence the melt temperature. However, the temperature may be readily set for any matrix by the skilled person. Generally, however, temperatures above about 150° C. should be avoided. The molten mass may then be extruded through a small orifice and comminuted into a powder. Depending upon the rapidity of solidification of the matrix, the matrix may need to be cured or quenched under pressure before being formed into a powder. This will prevent the gas from escaping from the matrix. The curing or quenching is preferably carried out rapidly but the time may vary from about 10 seconds to about 90 minutes.

In the context of the present document the amount of gas being released from the foamer ingredient is measured after the addition of liquid to the foamer ingredient. A preferred method for measuring the gas release is given below. Other methods may also be suitable.

1) Provide: A glass vial and a rubber cap for sealing it; a glass column having in the one end a funnel and a needle attached there to and in the other end a suction ball; a water bath, and a syringe.
2) Weigh precisely 1 to 4 g of powder and introduce the powder into a 20 ml glass vial and hermetically seal with a rubber cap. Adjust the volume of water in the glass column with the suction ball to exactly 25 ml (or record exact volume $V_0$).
3) Introduce the vial in the water bath vertically under the funnel. Pierce the rubber cap with the needle fixed at the column base and allow the air in the head space of the glass vial to escape into the funnel and glass column. Record $V_1$ which represents the volume in the head space of the vial.
4) Take away the vial from the needle while maintaining the vial under the funnel in the water bath: Inject exactly 5 g of water into the vial with a syringe through the rubber cap. Pierce again the cap with the fixed needle until no more gas bubble escape from the needle and measure the gas released into the glass column ($V_2$).

5) Take away the vial and put the thumb on the cap. Take the vial out of the bath while keeping the thumb on to the cap. Shake the vial to ensure good dissolution. Put the vial back under the funnel in the water batch and pierce again. Record $V_3$. The total volume of released gas (in ml) is $V_3-V_1-5$. The gas release per gram of powder is obtained by dividing the total volume by the initial weigh of powder.

If desired, the soluble foamer ingredient such as the creamer ingredient may contain other components such as artificial sweeteners, emulsifiers, stabilizers, thickeners, flowing agents, colors, flavors, aromas, and the like. Suitable artificial sweeteners include saccharin, cyclamates, acetosulfame, L-aspartyl based sweeteners such as aspartame, and mixtures of these. Suitable emulsifiers include monoglycerides, diglycerides, lecithin, diacetyl tartaric acid esters of mono-diglycerides (data esters), and mixtures thereof. Suitable stabilizers include dipotassium phosphate and sodium citrate. A suitable flowing agent is sodium silica aluminate.

The soluble foamer creamer ingredient preferably has a closed porosity. In the context of this document, closed porosity is calculated from the powder density as measured by helium picnometry. A preferred material is the Accu-Pyc™ 1330 Pycnometer from Micromeritics. The closed porosity is calculate as Porosity (%)=(1-density (g/ml)/1.525)*100.

The porosity is preferably of at least about 20% by volume; more preferably of at least 30% by volume; for example about 30 to about 40% by volume. The density of the soluble creamer ingredient is preferably about 200 g/l to about 500 g/l; for example about 300 g/l to about 400 g/l. The soluble creamer ingredient preferably has a moisture content below about 10% by weight; for example about 2% to about 8% by weight; preferably about 2% to about 6% by weight. The soluble creamer ingredient is readily soluble in hot or cold liquids such as water and milk. Further, the soluble creamer ingredient may advantageously have an appearance similar to that of conventional creamer powders.

The soluble foamer ingredient may be used as is in beverages and foodstuffs. However, the soluble foamer ingredient is preferably combined with a soluble creamer base to form a soluble creamer powder. Suitable soluble creamer bases are commercially available. The soluble creamer base may be a dairy creamer powder or a non-dairy creamer powder as desired. The fat content of the soluble creamer base may be selected as desired. Further, if desired although this is not necessary, the soluble creamer base may itself be gassed. Suitable gassed creamer bases are disclosed in European patent applications No 0154192, 0458310 and 0885566. The soluble creamer bases may be aromatized; for example with coffee aroma to provide the beverage produced upon reconstitution with improved coffee aroma. If natural coffee aroma is used to aromatise the soluble creamer base, the natural coffee aroma is in the form of organic coffee aroma components; usually carried in coconut oil.

The weight ratio of the soluble foamer ingredient or soluble creamer ingredient to the soluble creamer base in the soluble creamer powder is preferably about 1:5 to about 1:1; for example about 1:4 to about 1:2. Preferably, the soluble creamer ingredient comprises about 15% to about 50% by weight of the soluble creamer powder.

The mixture of the soluble foamer ingredient or soluble creamer ingredient and the soluble creamer powder may then be mixed with other components of the desired beverage or foodstuff powder.

Preferably, the soluble creamer powder is mixed with a soluble coffee powder to provide a soluble coffee beverage product. The soluble coffee powder may be any spray- or freeze-dried coffee powder. Further, if desired, the soluble coffee powder may contain coffee surrogates such as chicory. Such coffee powders are commercially available or may be produced by conventional extraction and drying techniques. If desired, the coffee powder may be in the form of an agglomerated powder. Preferably the soluble coffee powder comprises about 10% to about 30% by weight of the soluble coffee beverage product; for example about 10% to about 20% by weight. Of course, sweetening agents and flavors may be incorporated into the soluble coffee beverage product as desired.

The soluble creamer ingredient, or the mixture of it and the soluble creamer base may also be used in milk-shake powders, soup powders, sauce powders, etc.

EXAMPLES

Specific examples are now described to further illustrate the invention.

Example 1

A mixture of non-fat milk solids, caseinate, maltodextrin, lactose and sucrose is fed into an extruder. The moisture content is less than about 15% by weight. The temperature of the mixture in the extruder is raised to about 50 to 130° C. to melt the mixture and form a matrix. Nitrogen gas is then injected into the molten matrix at about 2 MPa. The gasified molten matrix is extruded through a 2 mm orifice into a pressure zone in which the pressure is maintained at about 3.5 MPa and the temperature at about 20° C. The extrudate remains in the pressure zone until cooled to ambient temperature. The cured extrudate is then comminuted to a powder of particles of size about 0.5 mm to about 3 mm.

The particles are dry mixed with a soluble creamer base and a soluble coffee powder in a weight ratio of about 1.5:7.0:1.5. An amount of 12 g of the resulting powder is placed in a beaker of about 0.06 m diameter and 100 ml of hot water (about 85° C.) is added. The resulting beverage is stirred twice. The beverage has a light, fluffy and stable foam of height above about 0.02 m. The volume of the foam is above about 60 ml.

Example 2

A mixture of skimmed milk, caseinate, maltodextrin, lactose and sucrose is prepared. The mixture has a solids content of about 55% by weight. Nitrogen gas is injected into the mixture and the mixture is spray dried to powder. The processing conditions are substantially as described in European patent application No 0154192. The resulting powder has a moisture content of about 4% by weight and a closed porosity of about 50% by volume before entrapment.

The powder is then subjected to an atmosphere of nitrogen gas at a pressure of about 2 MPa and at a temperature of about 70° C. for about 20 minutes. The powder is then rapidly quenched by rapid release of the pressure. The closed porosity after this gas treatment is about 32% by volume. A white powder is obtained which has an appearance similar to that of a soluble creamer base. The density of the powder is about 340 g/l to about 400 g/l.

The powder is mixed with a soluble creamer base and a soluble coffee powder in a weight ratio of about 2.0:6.3:1.7 to provide a soluble coffee beverage powder. An amount of 12 g of the resulting powder is placed in a beaker of about 0.06 m diameter and 100 ml of hot water (about 85° C.) is added. The resulting beverage is stirred twice. The beverage has a light, fluffy and stable foam of height above about 0.03 m. The foam volume is above about 80 ml. The beverage is tasted and has a good flavour and aroma.

Example 3

The soluble coffee beverage powder of example 2 (sample 1) is compared to the soluble coffee beverage powder of European patent application No 0154192 (sample A). Sample 1 and sample A each contains the same amount of soluble coffee powder per unit weight.

An amount of 12 g of each powder is placed in a glass beaker of about 0.06 m diameter and 100 ml of hot water (about 85° C.) is added. The resulting beverage is stirred twice. Both beverages have a light, fluffy and stable foam. The foam heights can be seen in the glass beaker. The foam heights and volumes are presented below in Table I.

TABLE I

| Sample | Foam Height (m) | Foam volume (ml) | Specific foam volume (ml/non-coffee g*) |
|---|---|---|---|
| 1 | 0.03 | 84 | 8.2 |
| A | 0.005 | 14 | 1.4 |

*the non-coffee weight is the weight of all ingredients other than the soluble coffee.

The volume of the foam produced by the powder of sample 1 is significantly greater than that of sample A.

Example 4

A mixture of maltodextrin (89.7%) and sodium caseinate (10.3%) is prepared. The mixture has a solids content of 58%. Nitrogen gas is injected into the mixture and the mixture is spray dried to powder. The resulting powder has a moisture content of about 3% by weight and a closed porosity of about 47% by volume. The powder is then subjected to an atmosphere of nitrogen gas at a pressure of about 5 MPa and at a temperature of about 130° C. for about 30 minutes. The powder is then rapidly quenched by rapid release of the pressure. The closed porosity after treatment is about 40% and the volume of entrapped gas is about 13.5 ml/g of powder.

The powder is mixed with sugar, skim milk powder, cold soluble chocolate powder, and cold soluble pre-gelatinized starch in a weight ratio of about 10/5/10/3.5/5. Vanilla and rum aromas are added.

100 ml of cold water or milk is added to 33.5 g of the resulting mixture. After a gentle stiring, a chocolate mousse with a light foam is obtained. The foam was stable for at least 5 minutes.

What is claimed is:

1. A powdered soluble foamer ingredient which comprises a matrix containing carbohydrate and protein and entrapped gas, the gas being present in an amount to release upon addition of liquid at least about 1 ml of gas ambient conditions per gram of soluble foamer ingredient.

2. A powdered soluble foamer ingredient for producing enhanced foam in foodstuffs and beverages, the ingredient comprising a matrix containing carbohydrate and protein and entrapped gas under pressure, the ingredient being obtainable by subjecting porous particles of the matrix to an atmosphere of the gas at a raise pressure and a temperature above the glass transition temperature of the particles; and quenching or curing the particles.

3. A powder soluble foamer ingredient according to claim 2, which has a density of 200 g/l to 500 g/l.

4. A powder soluble foamer ingredient according to claim 1, which has a density of 300 g/l to 400 g/l.

5. A powder soluble foamer ingredient according to claim 1, in which the powder soluble roamer ingredient is a soluble creamer ingredient.

6. A powder soluble foamer ingredient according to claim 1, which contains fat.

7. A powder soluble roamer ingredient according to claim 1, which comprises entrapped gas in an amount to release upon addition of liquid at least about 1.5 ml of gas at ambient conditions per gram of soluble foamer ingredient.

8. A powder soluble foamer ingredient according to claim 1, which comprises entrapped gas in an amount to release upon addition of liquid at from about 6 ml to about 18 ml of gas at ambient conditions per gram of soluble foamer ingredient.

9. A powder soluble foamer ingredient according to claim 1, in which the matrix comprises 40% to 98% by weight of carbohydrate.

10. A powder soluble foamer ingredient according to claim 1, in which the matrix comprises from 60% to 95% by weight of carbohydrate.

11. A powder soluble foamer ingredient according to claim 1, in which the protein includes milk proteins.

12. A powder soluble foamer ingredient according to claim 1, having a closed porosity.

13. A soluble creamer powder which comprises a creamer ingredient having a matrix containing carbohydrate and protein and entrapped gas, the soluble creamer powder generating a foam of volume at least about 5 ml/g of creamer powder when reconstituted in liquid, in which the creamer ingredient is as defined in claim 1.

14. A powder according to claim 13, in which the soluble creamer ingredient comprises 15% to 50% by weight of the powder.

15. A soluble creamer powder which comprises a creamer ingredient having a matrix containing carbohydrate and protein and entrapped gas, the soluble creamer powder generating a foam of volume at least about 5 ml/g of creamer powder when reconstituted in liquid.

16. A powder according to claim 15, in which the soluble creamer ingredient comprises 15% to 50% by weight of the powder.

17. A soluble beverage powder comprising a soluble coffee powder and a soluble creamer powder as defined in claim 15.

18. A soluble food powder which comprises a soluble foamer ingredient having a matrix containing carbohydrate and protein and entrapped gas, the soluble food powder generating a foam of volume at least about 5 ml ml/g of soluble foamer ingredient when reconstituted in liquid, in which the creamer ingredient is as defined in claim 1.

19. A soluble food powder which comprises a soluble foamer ingredient having a matrix containing carbohydrate and protein and entrapped gas, the soluble food powder generating a foam of volume at least about 5 ml/g of soluble foamer ingredient when reconstituted in liquid.

20. A powder according to claim 19 in which the soluble creamer ingredient comprises 15% to 50% by weight of the powder.

* * * * *

UNITED STATES PATENT AND TRADEMARK OFFICE
CERTIFICATE OF CORRECTION

PATENT NO. : 6,713,113 B2
DATED : March 30, 2004
INVENTOR(S) : Bisperink et al.

It is certified that error appears in the above-identified patent and that said Letters Patent is hereby corrected as shown below:

Column 7,
Line 60, change "gas ambient" to -- gas at ambient --;
Line 61, after "soluble foamer ingredient" insert -- wherein the ingredient is obtainable by subjecting porous particles of the matrix to an atmosphere of gas at a raised pressure and a temperature above the glass transition temperature of the particles; and quenching or curing the particles --; and
Line 67, change "atmosphere of the gas at a raise pressure" to -- atmosphere of gas at a raised pressure --.

Column 8,
Lines 8 and 12, change "soluble roamer ingredient" to -- soluble foamer ingredient --.

Signed and Sealed this

First Day of June, 2004

JON W. DUDAS
*Acting Director of the United States Patent and Trademark Office*